(12) United States Patent
Bouzonnet et al.

(10) Patent No.: US 11,412,064 B2
(45) Date of Patent: Aug. 9, 2022

(54) SYSTEM FOR SUGGESTING A LIST OF ACTIONS TO A USER, AND RELATED METHOD

(71) Applicant: BULL SAS, Les Clayes-sous-Bois (FR)

(72) Inventors: Loris Bouzonnet, Saint Marcellin (FR); Benoît Pelletier, Saint Etienne de Crossey (FR); Frank Petretto, Vaulnaveys le Bas (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/081,642

(22) PCT Filed: Feb. 28, 2017

(86) PCT No.: PCT/EP2017/054659
§ 371 (c)(1),
(2) Date: Aug. 31, 2018

(87) PCT Pub. No.: WO2017/148955
PCT Pub. Date: Sep. 8, 2017

(65) Prior Publication Data
US 2019/0028566 A1     Jan. 24, 2019

(30) Foreign Application Priority Data

Mar. 2, 2016   (FR) .................................... 1651768

(51) Int. Cl.
*H04L 67/306*     (2022.01)
*G06Q 30/06*     (2012.01)
(Continued)

(52) U.S. Cl.
CPC .......... *H04L 67/306* (2013.01); *G06F 16/435* (2019.01); *G06Q 30/02* (2013.01);
(Continued)

(58) Field of Classification Search
CPC ...... G06Q 30/02; G06Q 30/06; H04L 67/306; G06K 9/00288
(Continued)

(56) References Cited

U.S. PATENT DOCUMENTS

| | | | | |
|---|---|---|---|---|
| 5,963,447 | A | * | 10/1999 | Kohn ............... G05B 19/41865 700/49 |
| 9,143,677 | B1 | * | 9/2015 | Anon ................... H04N 5/2621 |

(Continued)

FOREIGN PATENT DOCUMENTS

EP     2 953 082 A1     12/2015

OTHER PUBLICATIONS

Sherman, Elaine, Anil Mathur, and Ruth Belk Smith. "Store environment and consumer purchase behavior: mediating role of consumer emotions." Psychology & Marketing 14, No. 4 (1997): 361-378. (Year: 1997).*

(Continued)

*Primary Examiner* — Suraj M Joshi
*Assistant Examiner* — Melaku Y Habtemariam
(74) *Attorney, Agent, or Firm* — Arc IP Law, PC; Joseph J. Mayo

(57) ABSTRACT

A system for suggesting a list of actions to a user includes a server and an automaton connected to the server. The system makes it possible to calculate a list of actions that is suited to a user while taking into account the identity of the user, the profile of the user, and the first context data. The profile of the user includes: a unique identifier associated with the identity of the user, a history of the selections already made by the user on the automaton, and the second context data and the datum representing the return of the user that are related to each selection already made. Thus it is possible to suggest, to a user, a list of actions wherein the list of actions is established on the basis of analysis of the (Continued)

selections previously made in a similar context by a pre-identified user.

20 Claims, 4 Drawing Sheets

(51) Int. Cl.
  *G06Q 30/02* (2012.01)
  *G06V 40/16* (2022.01)
  *G06F 16/435* (2019.01)
  *H04L 67/125* (2022.01)
  *H04L 67/50* (2022.01)

(52) U.S. Cl.
  CPC ............ *G06Q 30/06* (2013.01); *G06V 40/172* (2022.01); *H04L 67/125* (2013.01); *H04L 67/22* (2013.01)

(58) Field of Classification Search
  USPC .................................................. 709/217–219
  See application file for complete search history.

(56) References Cited

U.S. PATENT DOCUMENTS

| | | | | |
|---|---|---|---|---|
| 9,667,860 | B2* | 5/2017 | Hakim | ............... H04N 5/23293 |
| 2007/0150916 | A1* | 6/2007 | Begole | ............. H04N 21/44218 |
| | | | | 725/10 |
| 2008/0082946 | A1* | 4/2008 | Zilic | ................... G06F 30/3323 |
| | | | | 716/103 |
| 2011/0134026 | A1 | 6/2011 | Kang et al. | |
| 2013/0046637 | A1 | 2/2013 | Slutsky et al. | |
| 2013/0275957 | A1* | 10/2013 | Villar | ........................ G06F 8/65 |
| | | | | 717/173 |
| 2014/0147018 | A1* | 5/2014 | Argue | ................ G06Q 30/0201 |
| | | | | 382/115 |
| 2015/0106311 | A1* | 4/2015 | Birdwell | ................ G06N 3/063 |
| | | | | 706/20 |
| 2015/0348162 | A1* | 12/2015 | Morris | ............... G06Q 30/0631 |
| | | | | 705/26.7 |
| 2016/0142625 | A1* | 5/2016 | Weksler | ............. H04N 5/23222 |
| | | | | 348/222.1 |
| 2020/0349610 | A1* | 11/2020 | Publicover | ............ H04L 67/306 |

OTHER PUBLICATIONS

Wason, Ritika, A. K. Soni, and M. Qasim Rafiq. "Estimating software reliability by monitoring software execution through opcode." Int. J. Inf. Technol. Comput. Sci.(IJITCS) 7, No. 9 (2015): 23-30. (Year: 2015).*

International Search Report as issued in International Patent Application No. PCT/EP2017/054659, dated Apr. 6, 2017.

* cited by examiner

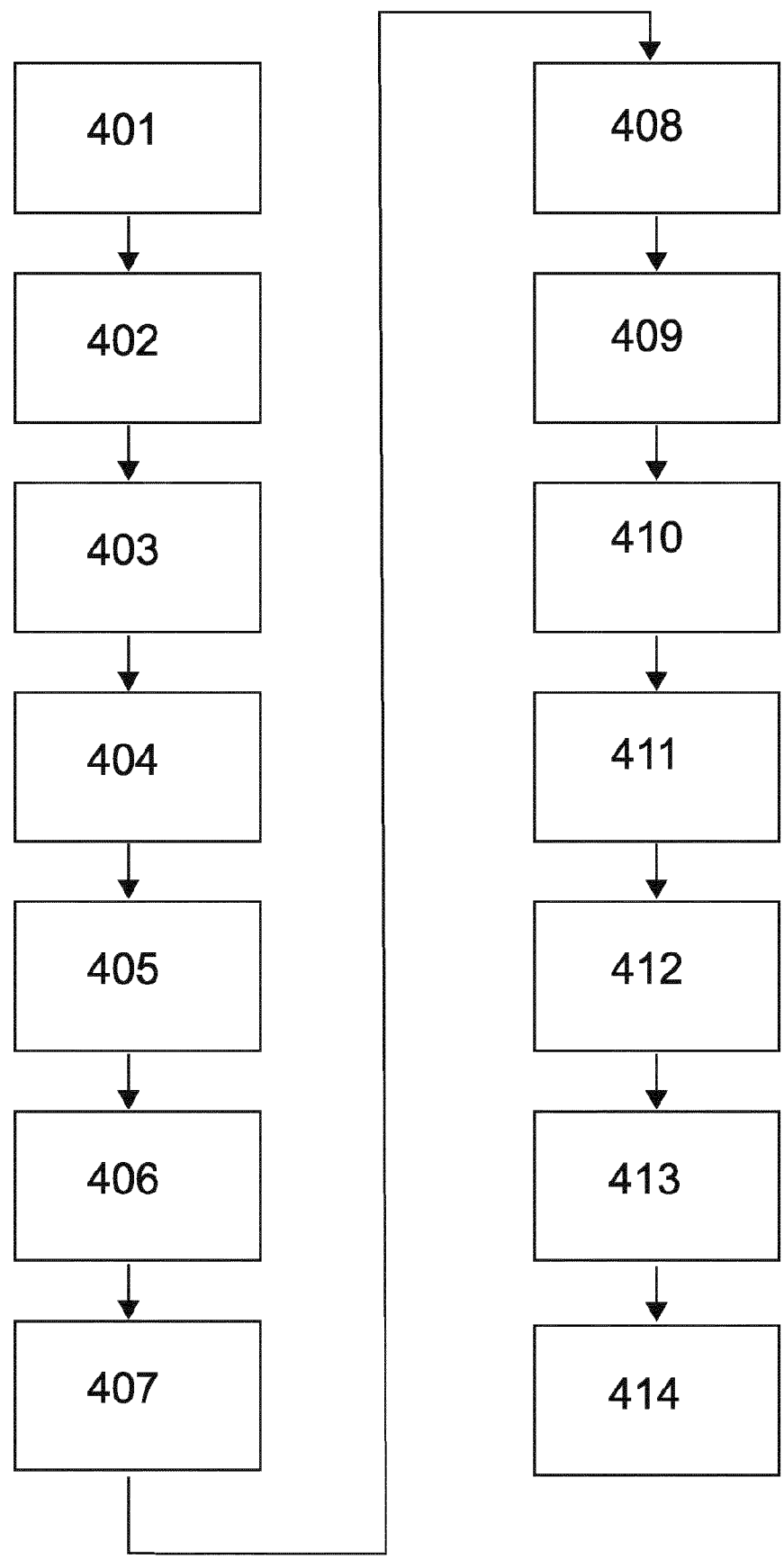

SYSTEM FOR SUGGESTING A LIST OF ACTIONS TO A USER, AND RELATED METHOD

CROSS-REFERENCE TO RELATED APPLICATIONS

This is the U.S. National Stage of PCT/EP2017/054659, filed Feb. 28, 2017, which in turn claims priority to French Patent Application No. 1651768, filed Mar. 2, 2016, the entire contents of all applications are incorporated herein by reference in their entireties.

TECHNICAL FIELD

The present invention relates to a system for suggesting a list of actions to a user.

PRIOR ART

In order to be able to suggest a list of actions to a user, it is often necessary to resort to a survey. To conduct this survey, it is possible to use a casing provided with buttons, each button corresponding to a datum relative to a feedback of a user as a function of the proposed action. The users can select the feedback datum by pressing on the appropriate button. The user may thus indicate whether the proposed action is suited or not to his profile or to the situation. Such devices are not without drawbacks however. Firstly, users can distort the result by pressing an important number of times on the keys. Furthermore, such devices only present information in an aggregated form, that is to say without it being possible to identify the feedback of each user and thus to adapt the proposed actions as a function of the user or the context.

In order to be free of these drawbacks, the document US 20110134026 A1 proposes a system that analyses the image of the user and extracts context information therefrom. From this context information, the system establishes a list of actions that is suited to the user. The list of actions thus obtained does not require a survey, but only rules established beforehand making it possible to associate context data with a suitable list of actions. However, the suitable list thus obtained is not personalised. Indeed, for a given context, two users will be proposed a same list of actions. Thus, if the list of actions is modified as a function of the context, the latter does not take into account the specificities of each user.

There thus exists a need for a system that proposes suitable actions to each user without the measurement of the feedback datum of the user being aggregated or distorted by erroneous inputs.

DESCRIPTION OF THE INVENTION

The invention aims to overcome these drawbacks by proposing a system for suggesting a list of actions to a user in which the suggested list of actions is established on the basis of an analysis of the selections previously made in a similar context by a pre-identified user.

To do so, the invention relates to a system for suggesting a list of actions to a user including a server, and an automaton connected to the server, the automaton comprising means for, when a user comes near to the automaton:
 acquiring an image of the user and first context data associated with the user;
 transmitting the acquired image of the user and the first context data to the server;

the server including means for:
 receiving the image of the user and the first context data;
 identifying the user from the image of the user;
 connecting to a data base in order to extract a profile of the user from the data base or to create a profile if the latter does not exist;
 calculating a list of actions that is suited to the user;
 transmitting the list of actions to the automaton.

The automaton also includes means for:
 receiving and displaying the list of actions in order to enable a selection by the user;
 identifying and carrying out the action selected by the user;
 acquiring second context data relative to the selected action;
 transmitting to the server the second context data and the selected action.

The server also includes means for receiving the second context data and the selected action, calculating a datum representative of a feedback of the user relative to the selected action from the second context data and updating the profile of the user in the data base, the profile of the user including:
 a unique identifier associated with the identity of the user, this identifier being for example generated automatically by the server;
 a history of the selections already made by the user on the automaton and the second context data and the datum representative of the feedback of the user relative to each selection already made.

Moreover, the calculation of the suitable list of actions takes into account the identity of the user, the profile of the user and the first context data.

The invention also relates to a method for suggesting a list of actions to a user implementing a system including a server and an automaton connected to the server, this method being implemented when a user comes close to the automaton, the automaton comprising means for acquiring an image of a user and means for acquiring context data.

The method includes:
 a step of acquisition by the automaton of an image of the user and first context data associated with the user;
 a step of transmission by the automaton to the server of the acquired image of the user and the first context data;
 a step of reception by the server of the image of the user and the first context data;
 a step of identification by the server of the user from the image of the user;
 a step of connection of the server to a data base in order to extract a profile of the user from the data base or to create a profile if the latter does not exist;
 a step of calculation by the server of a list of actions that is suited to the user;
 a step of transmission by the server to the automaton of the list of actions;
 a step of reception and display by the automaton of the list of actions in order to enable a selection by the user;
 a step of identification and execution by the automaton of the action selected by the user;
 a step of acquisition by the automaton of second context data relative to the selected action;
 a step of transmission by the automaton to the server of the data including the second context data and the selected action;
 a step of reception by the server of the second context data and the selected action;

a step of calculation by the server of a datum representative of a feedback of the user relative to the selected action from the second context data;

a step of updating by the server the profile of the user in the data base as a function of the data received.

The profile of the user includes:

a unique identifier associated with the identity of the user, this identifier being for example generated automatically by the server;

a history of the selections already made by the user on the automaton and the second context data and the datum representative of the feedback of the user relative to each of the actions selected.

The step of calculation by the server of the suitable list of actions takes into account the identity of the user, the profile of the user and the first context data.

Thus, the list of actions proposed to the user takes into account the selections previously made in a similar context. The actions may for example correspond to the order of a product. It is possible for example to envisage using the invention within the framework of a network of drinks distributors. In this case, the actions proposed to the user correspond to the ordering of a product.

The system for suggesting a list of actions to a user may also have one or more of the following characteristics taken independently or according to all technically possible combinations thereof.

Advantageously, the means for acquiring context data include a luminosity sensor and/or a sound sensor and/or an air quality sensor and/or a temperature sensor and/or a position sensor; the first and second context data including information on the luminosity and/or the soundscape and/or the air quality and/or the temperature and/or the position of the distributor.

Advantageously, the means for acquiring an image of the user are also used for the acquisition of the first and second context data.

Thus, the first and second context data further include data relative to the image of the user. This notably makes it possible to improve the evaluation of the feedback of the user during the step of calculation of a datum representative of a feedback of the user relative to the action selected from the second context data.

Preferably, the server further comprises means for, during the acquisition of the first and second context data:

connecting to an external network, for example the Internet;

extracting from the external network external context data;

integrating these external context data in the first and second context data.

Thus, it is possible to take into account external parameters and to integrate these parameters in the calculation of the suitable list of actions.

Advantageously, the system according to the invention further includes a remote means for displaying a dysfunction of the automaton connected to the server, the server further including means for:

associating a modification of a datum representative of the feedback of the user relative to a same action with a dysfunction of the automaton on which the action is carried out;

transmitting to the remote display means information concerning the dysfunction of the automaton.

Preferably, the information concerning the dysfunction includes information concerning the localisation of the automaton.

Advantageously, the remote display means comprise means for transmitting to the server an instruction intended for the automaton concerned by the dysfunction; the server comprising means for transmitting this instruction to the automaton concerned by the dysfunction and; the automaton comprising the means to execute this instruction.

Thus, it is possible to detect the dysfunction of an automaton on the basis of a feedback of the user, which makes it possible to ensure maintenance monitoring of the automaton without resorting to additional sensors.

Preferably, the system comprises a plurality of automatons connected by a network to the server and the history of the profile of the user comprises the selections already made by the user and the corresponding second context data and the datum representative of the feedback of the user on the plurality of automatons.

Thus, the list of actions suggested to the user is better targeted since it takes into account the selections previously made on the entire network of automatons.

Advantageously, the automaton is a distributor, each action being associated with a product, the distributor including a set point device comprising means for measuring the unused amount of product, the distributor further comprising means for:

associating this measurement with a second datum representative of a feedback of the user relative to the selected action;

transmitting the second datum representative of a feedback of the user to the server;

the server comprising means for updating the profile of the user in the data base while integrating therein the second datum representative of a feedback of the user and; the calculation of the suitable list of actions also taking into account the second datum representative of a feedback of the user.

This information makes it possible to adjust the suitable list of actions as a function of a second parameter acquired independently of the first, which increases the degree of reliability of the measurement of the datum representative of the feedback of a user.

BRIEF DESCRIPTION OF THE FIGURES

Other characteristics and advantages of the invention will become clear on reading the detailed description that follows, with reference to the appended figures, which illustrate:

FIG. 4, a flow chart of a method according to a fourth embodiment.

For greater clarity, identical or similar elements are marked by identical reference signs in all of the figures.

DETAILED DESCRIPTION OF AT LEAST ONE EMBODIMENT

Figure 1:
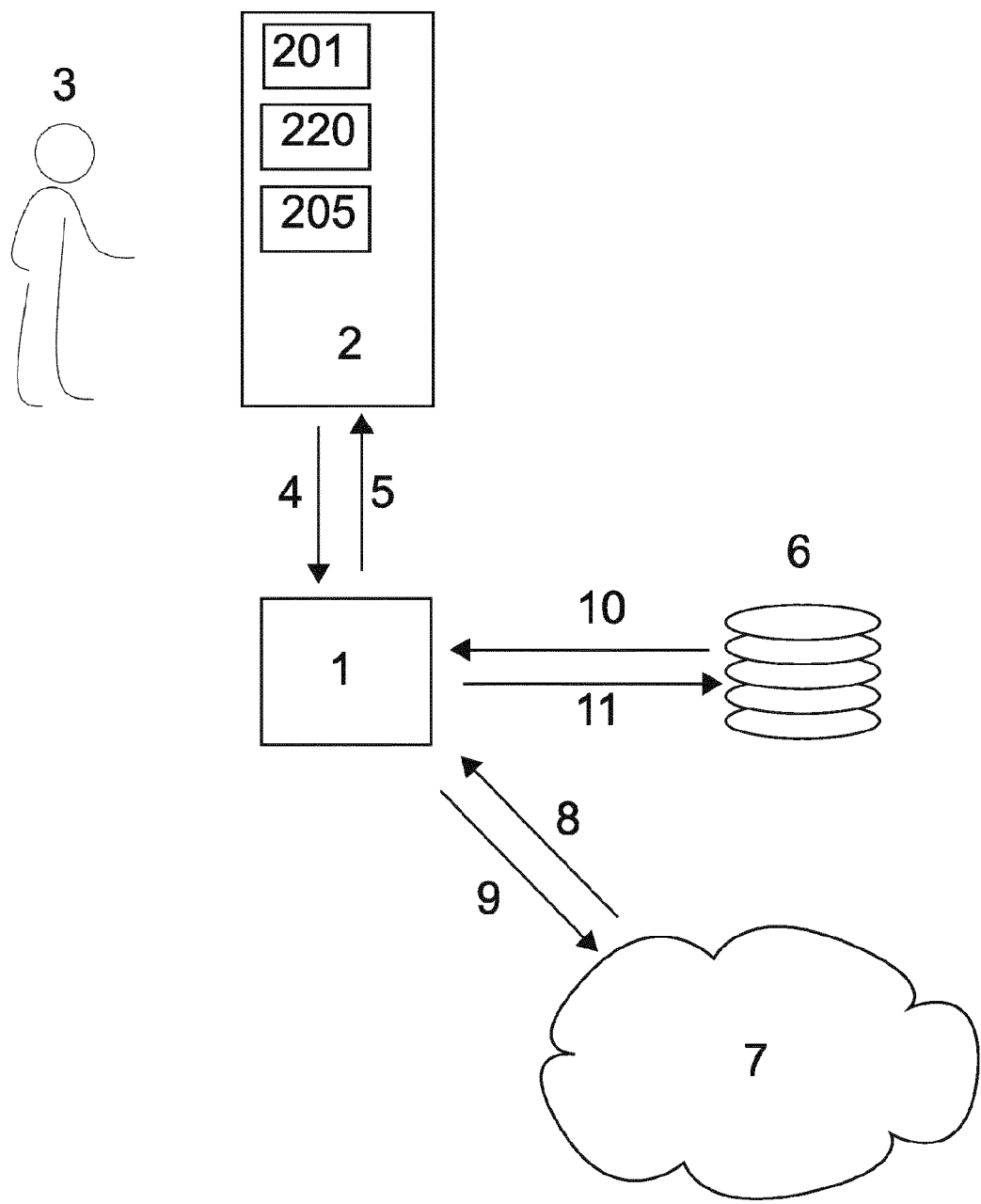
FIG. 1, a view of the system according to a first embodiment.

FIG. 1 shows a first embodiment of a system for suggesting a list of actions to a user according to the invention. The system includes a server (1) and an automaton (2) connected to the server (1), the automaton comprising means for, when a user comes close to the automaton:

acquiring an image (201) of the user (3) and first context data (220) associated with the user;
transmitting (4) to the server (1) the acquired image of the user and the first context data.

The server includes means for:
receiving (4) the image of the user (3) and the first context data;
identifying the user (3) from the image of the user (3);
connecting (10,11) to a data base (6) in order to extract (10) a profile of the user (3) from the data base (6) or to create (11) a profile if no profile exists;
calculating a list of actions that is suited to the user (3);
transmitting (5) the list of actions to the automaton (2).

The connection means (4, 5, 10, 11) between the server (1) and the automaton (2) or between the server (1) and the data base (6) may take the form of a connection from a local network. Alternatively, the connection may be made using a network such as the Internet. In this case, it is possible to envisage using a technology of VPN (virtual private network) type.

In yet another embodiment, the connection may be made by a wireless network, for example a GSM network, which limits the adjustments to make in order to connect the automaton or the data base to the server.

The automaton (2) includes means for:
receiving (5) and displaying (205) the list of actions in order to enable a selection by the user (3);
identifying and carrying out the action selected by the user (3);
triggering the acquisition of second context data (220) relative to the selected action;
transmitting (4) to the server (1) the data including the second context data and the selected action.

The display means (205) may consist in a touch screen. In this case, the display means (205) and the means for identifying the selection are merged. In another embodiment, the display means (205) include a conventional screen and the selection means consist of buttons situated on the perimeter of the display screen. Preferentially, the first and second context data are obtained using the same means for acquiring context data (220).

The presence of a user (3) close to the automaton (2) may be detected by the interaction of the user (3) with the automaton (2) using selection means, for example, if the selection means consist in a touch screen, when the user (3) touches the touch screen.

The server (1) also includes means for receiving (4) the second context data and the selected action, calculating a datum representative of a feedback of the user (3) relative to the selected action from the second context data and updating (11) the profile of the user (3) in the data base (6).

The calculation of a datum representative of a feedback of the user (3) may take into account all of the context data or only a part of these context data. For example, if the context data include a datum representative of the temperature and a datum representative of the tone of voice of a user (3), then the calculation of the datum representative of a feedback of the user (3) could be done from the data concerning the tone of voice of the user (3).

The profile of the user (3) notably includes:
a unique identifier associated with the identity of the user (3), this identifier being for example generated automatically by the server (1);
a history of the selections already made by the user (3) on the automaton (2) and the second context data and the datum representative of the feedback of the user (3) relative to each selection already made.

The fact of storing the datum representative of a feedback of the user (3) makes it possible not to have to recalculate the latter from the second context data but to be able to access it directly. An alternative embodiment could however be envisaged where the data base (6) does not include the datum representative of a feedback of the user (3) but that the latter is recalculated when necessary from the second context data.

The calculation of the suitable list of actions takes into account the identity of the user (3), the profile of the user (3) and the first context data. Thus, for a given user (3), the analysis of the previous actions is not conducted in an isolated manner, but in taking into account the context information and the feedback of the user (3) associated with each of the selections made previously.

Indeed, in the system which is the object of the invention, when the user (3) comes in front of the automaton (2), an image of the user is acquired by the means for acquiring an image of the user (201). This acquisition may be made by means of a video camera or instead a photo camera. The user is next identified, this identification being able to be carried out by the implementation, at the level of the server (1), of a face recognition algorithm on the basis of the image of the user (3) acquired previously. The algorithms required for this identification are known to those skilled in the art and will thus not be detailed herein.

After the step of identification, the first context data are acquired and the server (1) extracts from the profile of the user (3) the actions previously selected by the user (3) and the second context data and the datum representative of the feedback of the user (3) associated with each of these selections.

As a function of the profile of the user (3) and the first context data, a suitable list of actions is calculated then proposed to the user (3). For example, if the first context data contain information relative to the temperature, the actions selected previously in temperature conditions similar to the temperature measured by the means for acquiring context data (220) may be inserted in the suitable list of actions. This is an example in which the context data only contain information relative to the temperature, but the context data may comprise information concerning several parameters.

In one embodiment according to the invention, the automaton (2) may be a coffee distributor. The suggested action then corresponds to the preparation of a coffee. The data associated with each action may then include the type of coffee, the amount of sugar and the size of the coffee. Thus, an action is defined by these three parameters. In one exemplary embodiment, the two actions previously selected by the user (3) are grouped together in the table below accompanied by corresponding data representative of the feedback of the user (3).

| Name of the coffee | Amount of sugar | Size | Rating (/5) |
|---|---|---|---|
| C1 | 2 | Short | 1 |
| C3 | 3 | Long | 4 |

In this example, the types of coffee capable of being associated with an action are to be selected from a list of coffees grouped together in the table below accompanied by their strength and their origin.

| Name of the coffee | Strength | Origin |
| --- | --- | --- |
| C1 | 2 | Mexico |
| C2 | 1 | Peru |
| C3 | 2 | Peru |
| C4 | 3 | India |

As detailed previously, the method according to the invention makes it possible to generate a suitable list of actions from the profile of the user (3) which includes a unique identifier associated with the identity of the user (3), a history of the selections already made (here the type of coffee, the amount of sugar and the length of the coffee) by the user (3) and the datum representative of the feedback of the user (3) relative to each selection already made and calculated from the second context data. In order to obtain the suitable list of actions, the system according to the invention may firstly select the coffee for which the feedback of the user (3) is greater than three. The coffee C3 has a user feedback (3) greater than three and thus meets the first criterion. Secondly, the selection of the type of coffee may be carried out as a function of the origin of the coffee. The coffee C2 has the same origin as the coffee C3 and thus meets the second criterion. Thirdly, the selection of the type of coffee may be made as a function of the strength of the coffee. The coffee C1 has the same strength as the coffee C3 and thus meets this third criterion. The suitable list of actions suggested to a user (3) then includes in order an action linked to the coffee C3 then C2 then C1 and finally C4. In order to determine the two other parameters of the action to carry out, the system according to the invention may take into account the action having the highest feedback of the user (3) contained in the profile of the user (3). In this example, the action having the highest feedback user (3) is associated with an amount of sugar at 3 and a size at Long. The two latter parameters of the actions of the suitable list of actions will be preconfigured at 3 for the amount of sugar and at Long for the size of the coffee.

In this example, the suitable list of actions displayed by the system according to the invention will thus be the following.

| Name of the coffee | Amount of sugar | Size |
| --- | --- | --- |
| C3 | 3 | Long |
| C2 | 3 | Long |
| C1 | 3 | Long |
| C4 | 3 | Long |

As detailed in this example, a suitable list of actions is thus obtained as a function of the selections previously made and the feedback of the user (3) calculated from the second context data.

Once an action is selected by the user (3) and when the latter is carried out by the automaton (2), an acquisition of second context data is carried out. The acquisition of these second context data is also accompanied by the calculation, from these second context data, of a datum representative of a feedback of the user (3) relative to the selected action. This datum representative of the feedback of the user (3) may for example comprise information regarding the smooth progress of the selected action. The second context data acquired during this step preferably concern the same parameters (temperature, luminosity, etc.) as the first context data so as to facilitate the analysis between the first context data and the second context data during the calculation of the suitable list of actions.

In one embodiment, when certain context data are not likely to change between the acquisition of the first context data and the acquisition of the second context data, the data obtained during the acquisition of the first context data are integrated in the second context data without it being necessary to carry out a second acquisition. For example, if the context data include the temperature, the temperature integrated in the second context data will be identical to the temperature contained in the first context data. Indeed, the temperature is not likely to change between the two steps of acquisition and the temperature is thus not re-measured during the acquisition of the second context data. In other words, in this embodiment, only measured during the step of acquisition of the second context data are context data likely to undergo a change between the step of acquisition of the first context data and the step of acquisition of the second context data.

In one embodiment, if the automaton (2) is a drinks distributor, it is possible to associate a datum representative of a positive feedback of the user (3) with the detection of a smile and negative with the detection of a grimace. If for a previously selected action, the datum representative of a feedback of the user (3) has been negative, it is for example possible to modify the suitable list of actions in order that it no longer contains this action in the future.

In the calculation of the suitable list of actions, it is however advantageous to combine the information associated with the datum representative of a feedback of the user (3) with the first and second context data. Indeed, the datum representative of a feedback of the user (3), although calculated as a function of the second context data, does not necessarily take into account all of the context data. For a given user (3), an action may thus give rise to a datum representative of a feedback of the user (3) that is negative for a given context and positive for a second context different to the first. For example, if the automaton (2) is a drinks distributor, an action corresponding to the preparation of a soup may give rise to a datum representative of the feedback of the user (3) that is positive if the external temperature is low and negative if the external temperature is high. In this case, the system according to the invention will highlight in the suitable list of actions the action corresponding to the preparation of a soup only if the first context data confirm a low external temperature.

Thus, as indicated previously, the system according to the invention does not only take into account the history of the actions previously selected, but also the context in which these selections have been made and the datum representative of the feedback of the user (3) associated with each of these selections. The calculation of this suitable list of actions may for example be performed using AlchemyAPI software.

As already mentioned, the context data may contain information of different types concerning the environment of the user (3). The context data may for example include, in addition to the information acquired by the means for acquiring context data (220), additional context data extracted from the image of the user (3). In this case, the means for acquiring an image are used in the step of identification of the user (3) but also in the steps of acquisition of first and second context data. The data relative to the image of the user (3) may thus be used in the step of calculation (413) of a feedback of the user (3).

For example, the server (1) may comprise means for extracting the corpulence and/or the age and/or the sex of the user (3). These context data may also include information on the presence of other persons around the user (3). If the user (3) is accompanied, this detection could be done by analysing the presence of faces around the face of the user (3). It may thus be done by using one of the previously mentioned face detection algorithms. The server (1) may also comprise means for detecting, using the image of the user (3), the festive aspect of said user, identifying therefrom the presence or the absence of a smile for example. Generally speaking, any means for detecting facial expressions may be used (for example, eyebrow movement, etc.). In one embodiment, the measurement of the luminosity can be carried out through the means for acquiring an image (201) of the user (3) rather than by an independent luminosity sensor (221).

Figure 2:
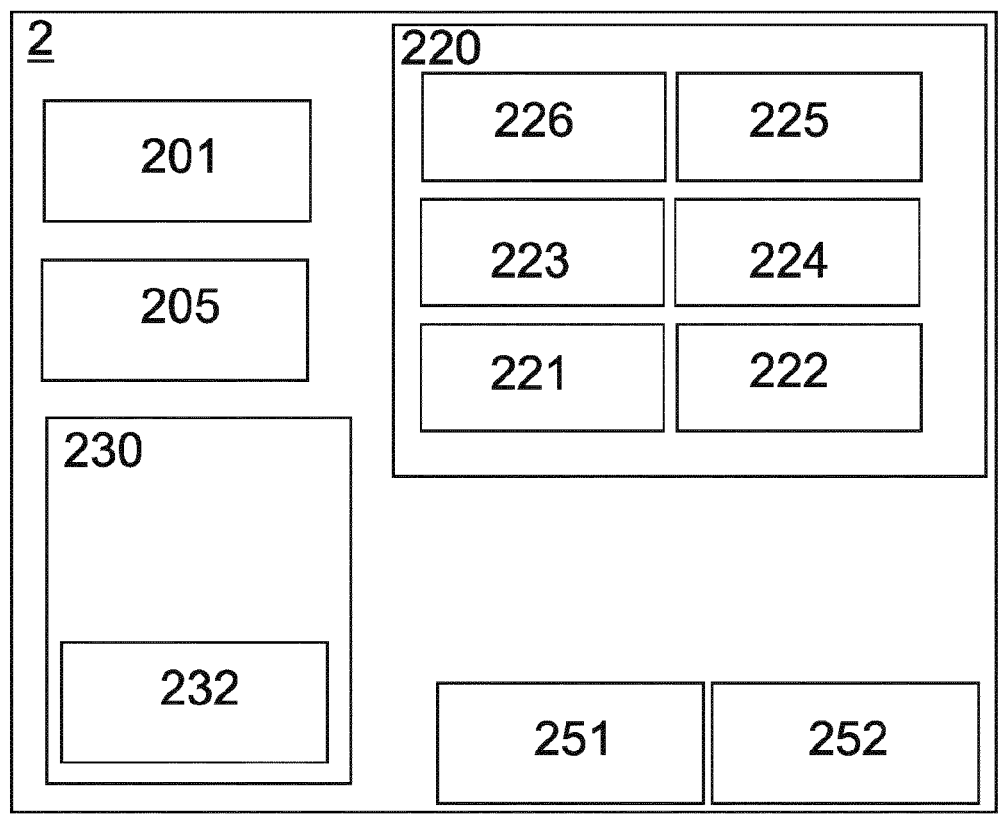
FIG. 2, a view of the automaton and the modules for acquiring context data according to a second embodiment.

In a second embodiment illustrated in FIG. 2, the means for acquiring context data (220) of the automaton (2) include a luminosity sensor (221). The first and second context data then include information on the luminosity.

The means for acquiring context data (220) may also include a sound sensor (222). The first and second context data then include information on the soundscape. The server (1) may then comprise means for extracting complementary information on the aspect of the user (3) from the sound information acquired. It is for example possible to evaluate the state of stress of the user (3) by analysing his voice and incorporating this information in the context data. It is also possible in this embodiment to take into account, for the calculation of the feedback of a user (3), not only the data relative to an image of the user (3) but also the data relative to the voice of the user (3) such as the tone of the voice or the sound volume of the voice of the user (3).

The means for acquiring context data (220) may also include an air quality sensor (223). The first and second context data then comprise information on the air quality. This embodiment is particularly suited when the automaton (2) is arranged outside.

The means for acquiring context data (220) may also include a temperature sensor (224) and/or a position sensor (225). The first and second context data then comprise information on the temperature and/or the position of the automaton (2).

The means for acquiring context data (220) may also include an alcohol level detector (226) making it possible to detect the alcohol level of the user (3). An AlcoolFrame detector sold by the LaserSystem company may for example be integrated in the automaton (2). This alcohol level information may next be integrated in the first and second context data.

The context data may also be obtained by a combined analysis of several items of information. For example, the stress evaluation may be carried out by a combined analysis of the sound acquired using the sound sensor (222) and of the image associated with a user (3) acquired using the means for acquiring an image (201) of the user (3) in order to improve the precision of the evaluation. The same means may also be used in order to detect the state of fatigue of the user (3).

It may also be advantageous to have access to information concerning the indirect environment of the user (3) in order to integrate said information in the context data. To this end, in one embodiment, the server (1) comprises means for, during the acquisition of the first and second context data:
  connecting (9) to an external network (7), for example the Internet;
  extracting (8) from the external network external context data;
  integrating these external context data in the first and second context data.

It is possible for example to integrate in the context data meteorological information such as the external temperature or the humidity level. It can also take into account information extracted from social networks concerning recent events.

In one embodiment, the automaton (2) is a distributor of products and each action is associated with a product. Moreover, the distributor (2) includes a set point device (230) comprising means for measuring (232) the unused amount of product associated with the selected action.

The distributor (2) further comprises means for associating this measurement with a second datum representative of a feedback of the user (3) relative to the selected action and for transmitting (4) the second datum representative of a feedback of the user (3) to the server (1). Alternatively, the distributor (2) may transmit to the server the measurement of the unused quantity of product and the server (1) then comprises means for associating this measurement with a second datum representative of a feedback of the user. The server (1) comprises means for updating (11) the profile of the user (3) in the data base (6) while integrating therein the second datum representative of a feedback of the user (3) and in associating it with the selected action. Thus, the calculation of the suitable list of actions also takes into account the second datum representative of a feedback of the user (3).

In a complementary manner, the user (3) may for example be encouraged to express a feedback of the user (3) by a facial expression. The server then comprises means for extracting from the image of the user, and in particular from his facial expression, a datum representative of the feedback of the user. In this case, the second datum representative of the feedback of a user (3) is an aggregated datum representative of the feedback of the user (3) combining the measurement of the unused quantity of product and the datum representative of the feedback of the user (3) obtained through an interaction with the user (3). In one embodiment, the aggregated datum is obtained from a weighted average of the feedbacks of the user (3) associated with each of the two measurements. The feedback associated with the facial expression may for example be assigned a more important weighting than the datum associated with the unused quantity of product. This configuration makes it possible to take into account cases in which the user (3) has not used all of the product owing to time constraints but is all the same satisfied with the latter.

This information makes it possible to adjust the suitable list of actions as a function of an acquired second parameter concerning the feedback of the user (3) independent of the first, which improves the reliability of the measurement of the datum representative of a feedback of the user (3).

Figure 3:
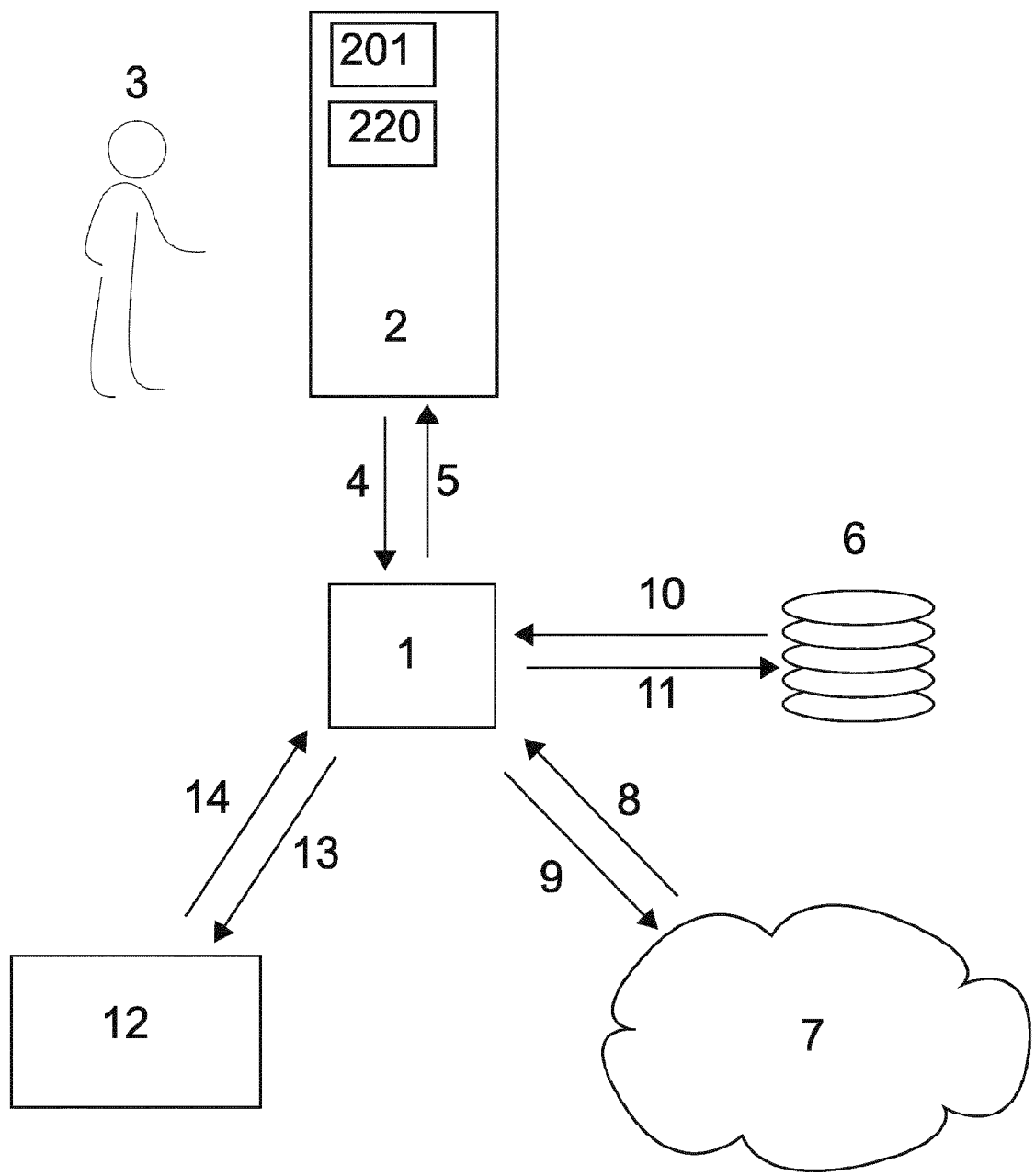
FIG. 3, a view of the system according to a third embodiment.

In one embodiment illustrated in FIG. 3, the system further includes a remote device for displaying (12) a dysfunction of an automaton (2) connected (13, 14) to the server (1) and the server (1) includes means for:
  associating a modification of the datum representative of the feedback of the user (3) relative to a same action with a dysfunction of the automaton (2) on which the action is carried out;
  transmitting (13) to the remote display device (12) information concerning the dysfunction of the automaton (2).

Indeed, if the datum representative of the feedback of the user (3) associated with an action changes suddenly, it is probable that the selected action is no longer executed correctly on account of a dysfunction. It is then possible to display this dysfunction using a remote display means (12).

However, in order to avoid an untimely triggering of alerts, a threshold corresponding to a minimum number of users (3) for which a change in the datum representative of the feedback of the user (3) relative to a given action is observed may be put in place. Thus, if the change in the datum representative of the feedback of the user relates to a single user or a limited number of users (3), the automaton (2) will not be flagged as dysfunctional. On the other hand, if a change in the datum representative of the feedback the user (3) is observed with a large number of users (3), then the automaton (2) will be flagged as dysfunctional. This threshold may be set or calculated as a function of the level of use of the automaton (2), this level of use being for example equal to the number of single users (3) using the automaton (2) each day.

In one embodiment, the automaton includes localisation means (225) and the information concerning the dysfunction includes information on the localisation of the automaton (2). It is thus possible to know the position of the automaton (2) concerned by the dysfunction and potentially to send a maintenance technician there.

In one embodiment, the remote display device (12) comprises means for transmitting (14) to the server (1) an instruction intended for the automaton (2) concerned by the dysfunction; the server comprising means for transmitting (5) this instruction to the automaton (2) concerned by the dysfunction and; the automaton (2) comprising the means for executing this instruction.

Thus, the automaton (2) could for example be ordered to go into a standby mode in which no further action is carried out. In an alternative or complementary manner, the automaton (2) could be ordered to display a message flagging the dysfunction. In an alternative or complementary manner, information could be displayed to the user (3) relative to one or more actions to carry out in order to remedy the dysfunctional state of the automaton (2).

The information concerning the dysfunction of the automaton (2) could also be taken into account to adjust the suitable list of actions. For example, if a dysfunction is associated with a clearly defined action, it will be possible to order the automaton (2) to no longer display this action in the suitable list of actions.

In a fourth embodiment illustrated in FIG. 4, the method for suggesting a list of actions to a user (3) implements a system including a server (1) and an automaton (2) connected to the server (1), when a user comes close to the automaton. The automaton comprises means for acquiring an image (201) of a user (3) and means for acquiring context data (220) and the method includes:
- a step (401) of acquisition by the automaton (2) of an image of the user (3) and the first context data associated with the user (3);
- a step (402) of transmission by the automaton (2) to the server (1) of the acquired image of the user and the first context data.

The method further includes a step of reception (403) by the server (1) of an image of the user (3) and the context data associated with the user (3) coming from the means for acquiring context data (220).

The connection between the automaton (2) and the server (1) may be made through a wireless connection. It would be possible for example to use the GSM network which limits the adjustments to be made in order to connect the automaton (2) to the server (1).

The method further includes a step of identification (404) by the server (1) of the user (3) from an image of the user (3). This step could be carried out by any facial recognition algorithm known to those skilled in the art.

The method also includes a step of connection (405) of the server (1) to a data base (6) in order to extract a profile of the user (3) from the data base (6) or to create a profile if the latter does not exist. The connection of the server (1) to the data base (6) may be made through a local network, for example by means of a Wi-Fi type wireless connection.

The method also includes a step of calculation (406) by the server (1) of a list of actions that is suited to the user (3). This calculation notably takes into account the identity of the user (3), the profile of the user (3) and the first context data.

The method further includes:
- a step of transmission (407) by the server to the automaton of the list of actions;
- a step (408) of reception and display by the automaton of the list of actions in order to enable a selection by the user;
- a step (409) of identification and execution by the automaton of the action selected by the user.

The display step may be achieved by means of a touch screen. In this case, the means for displaying and the means for identifying the selection are merged. In another embodiment, the display means (205) is a conventional screen and the selection means consist of buttons situated on the perimeter of the display screen.

The method also includes a step of acquisition (410) by the automaton (2) of second context data relative to the selected action. The second context data are acquired using means for acquiring context data (220) from the automaton (2).

The method further includes:
- a step (411) of transmission by the automaton to the server of data including the second context data and the selected action;
- a step (412) of reception by the server of the second context data and the selected action;
- a step of calculation (413) by the server of the datum representative of a feedback of a user from the second context data;
- a step (414) of updating by the server the profile of the user in the data base as a function of the data received.

The profile of the user (3) includes:
- a unique identifier associated with the identity of the user, this identifier being for example generated automatically by the server; a history of the selections already made by the user on the automaton and the second context data and the datum representative of the feedback of the user relative to each of these selections.

The previous embodiments only comprise a single automaton. However, it is also possible to envisage an embodiment in which a plurality of automatons (2) are available connected via a network to the server (1). In this embodiment, the history of the profile of the user (3) comprises the selections already made by the user (3) on all of the automatons (2). This embodiment makes it possible, from a single server (1), to manage a network comprising a plurality of automatons (3). This also makes it possible to conserve, in a single data base (6), information concerning the users (3) of the plurality of automatons (2). The calculation of the suitable list of actions may thus be made on a greater number of users (3). Furthermore, it is possible during the calculation of a suitable list for a user using any one of the automatons (2) of the system to take into account the selections made previously on any one of the automatons (2) of the system.

What is claimed is:

1. A system for suggesting a list of actions to a user including a server and an automaton connected to the server, the automaton comprising means for, when said user comes close to the automaton:
   acquiring an image of the user and a first context data associated with the user, the first context data being acquired using means for acquiring context data;
   transmitting the image of the user and the first context data to the server;
   the server comprises means for:
     receiving the image of the user and the first context data;
     identifying the user from the image of the user to get an identity of the user;
     connecting to a database in order to extract, using the identity of the user, a profile of the user from the database or to create the profile if the profile does not exist;
     calculating, based on the identity of the user, the profile of the user and the first context data, said list of actions that is suited to the user;
     transmitting to the automaton the list of actions;
   the automaton further comprises means for:
     receiving and displaying the list of actions in order to enable a selection by the user;
     identifying and carrying out an action selected by the user from said list of actions;
     acquiring second context data relative to the action selected by the user;
     transmitting to the server the second context data and the action selected by the user;
   the server further comprising means for receiving the second context data and the action selected by the user, the second context data being acquired using the means for acquiring context data, calculating a datum representative of a feedback of the user relative to the action selected and from the second context data and updating the profile of the user in the database, the profile of the user including:
   a unique identifier associated with an identity of the user;
   a history of selections already made by the user on the automaton and the second context data and the datum representative of the feedback of the user relative to each selection already made of said history of the selections;
   the calculating the list of actions that is suited to the user takes into account the identity of the user, the profile of the user and the first context data;
   the system further comprising a remote means for displaying a failure to operate of said automaton connected to the server and wherein the server further comprises means for:
     associating a modification of said datum representative of the feedback of the user relative to a same action for a same context with said failure to operate of the automaton on which the action is carried out;
     transmitting to the remote means for displaying information concerning the failure to operate of the automaton.

2. The system according to claim 1, wherein
the means for acquiring context data include one or more of a luminosity sensor, a sound sensor, an air quality sensor, a temperature sensor, a position sensor; the first context data and the second context data including information on one or more of a luminosity, a soundscape, an air quality, a temperature, a position of a distributor.

3. The system according to claim 1, wherein the means for acquiring the image of the user are also used for the acquiring of the first context data and the acquiring of the second context data.

4. The system according to claim 1, wherein the server further comprises means for, during the acquiring of the first context data and the acquiring of the second context data:
   connecting to an external network;
   extracting from the external network external context data;
   integrating the external context data in the first context data and the second context data.

5. The system according to claim 1, wherein the automaton comprises a localisation means and wherein the information concerning the failure to operate includes information on localisation of the automaton.

6. The system according to claim 1, wherein the remote means for displaying comprise means for transmitting to the server an instruction intended for the automaton concerned by the failure to operate; the server further comprising means for transmitting said instruction to the automaton and; the automaton comprising the means for carrying out said instruction.

7. The system according to claim 1, further comprising a plurality of automatons connected via a network to the server and wherein the history of the profile of the user comprises the selections already made by the user and corresponding second context data and the datum representative of the feedback of the user on the plurality of automatons.

8. The system according to claim 1, wherein the automaton is a distributor, each action being associated with a product, the distributor including a set point device comprising means for measuring an unused quantity of said product, the distributor further comprising means for:
   associating a measurement from said means for measuring with a second datum representative of a second feedback of the user relative to the action selected;
   transmitting the second datum representative of said second feedback of the user to the server;
   the server further comprising means for updating the profile of the user in the database while integrating therein the second datum representative of a feedback of the user and; the calculating of the list of actions that is suited to the user also taking into account the second datum representative of the second feedback of the user.

9. The system of claim 1, wherein
the automaton is a distributor of drinks;
the list of actions comprises a list of drink options; and,
the list of drink options comprises one or more of
   drink type options;
   drink size options;
   drink ingredients options.

10. The system of claim 9, wherein the calculating the list of actions comprises
   identifying one or more previously selected drink options in the history of selections already made by the user, wherein the feedback of the user relative to the one or more previously selected drink options is positive; and,
   including in the list of actions one or more similar drink options that share one or more characteristics with the one or more previously selected drink options.

11. The system of claim 10, wherein
the drinks comprise coffee;
the list of drink options comprises
coffee type options;
coffee size options; and
amount of sugar options; and,
the one or more characteristics comprise one or more of
strength of coffee;
origin of coffee.

12. The system of claim 10, wherein
the second context data comprises a second image of the user;
the calculating a datum representative of a feedback of the user comprises
analyzing the second image of the user to determine a facial expression of the user;
when the facial expression of the user comprises a smile, calculate the datum representative of a feedback of the user as positive feedback; and,
when the facial expression of the user comprises a grimace, calculate the datum representative of a feedback of the user as negative feedback.

13. The system of claim 12, wherein the automaton is configured to encourage the user to provide the feedback of the user via the facial expression of the user.

14. The system of claim 1, wherein
the means for acquiring the first context data and the means for acquiring the second context data comprise a sound sensor;
the first context data comprises first voice data related to a voice of the user; and,
the second context data comprises second voice data related to the voice of the user.

15. The system of claim 14, wherein
the calculating a datum representative of a feedback of the user comprises one or both of
analyze a tone of voice of the second voice data;
analyze a volume of voice of the second voice data.

16. The system of claim 14, wherein
the calculating the list of actions that is suited to the user comprises evaluating a state of stress or fatigue of the user by analyzing the first voice data.

17. The system of claim 16, wherein
the evaluating the state of stress or fatigue of the user further comprises analyzing the image of the user.

18. The system of claim 1, wherein
the calculating the list of actions that is suited to the user comprises selecting actions previously selected in previous conditions that are similar to measured conditions included in the first context data.

19. The system of claim 18, wherein the first context data comprises one or both of
meteorological information extracted from an external network;
information concerning recent events extracted from the external network.

20. A method for suggesting a list of actions to a user implementing a system including a server and an automaton connected to the server, when said user comes close to the automaton, the automaton comprising means for acquiring an image of the user and means for acquiring context data, the method comprising:

a step of acquisition by the automaton of the image of the user and first context data associated with the user, the first context data being acquired using means for acquiring context data;
a step of transmission by the automaton to the server of the image of the user and the first context data;
a step of reception by the server of the image of the user and the first context data;
a step of identification by the server of the user from the image of the user to get an identity of the user;
a step of connection of the server to a database in order to extract, using the identity of the user, a profile of the user from the database or to create the profile if the profile does not exist;
a step of calculation by the server, based on the identity of the user, the profile of the user and the first context data, of said list of actions that is suited to the user;
a step of transmission by the server to the automaton of the list of actions;
a step of reception and display by the automaton of the list of actions in order to enable a selection of an action by the user;
a step of identification and execution by the automaton of the action selected by the user;
a second step of acquisition by the automaton of second context data relative to the action selected;
a step of sending by the automaton to the server data including the second context data and the action selected;
a second step of reception by the server of the second context data and the action selected, the second context data being acquired using the means for acquiring context data;
a second step of calculation by the server of a datum representative of a feedback of the user relative to the action selected and from the second context data;
a step of updating by the server the profile of the user in the database as a function of the context data received;
the profile of the user including:
a unique identifier associated with an identity of the user;
a history of selections already made by the user on the automaton and the second context data and the datum representative of the feedback of the user relative to each selection already made;
the step of calculation by the server of the list of actions that is suited to the user taking into account the identity of the user, the profile of the user and the first context data, wherein the system comprises a remote means for displaying a failure to operate of the automaton connected to the server and wherein the method further comprises:
a step of association, by the server, of a modification of the datum representative of the feedback of the user relative to a same action for a same context with said failure to operate of the automaton on which the action is carried out;
a second step of transmission, by the server, to the remote means for displaying of information concerning the failure to operate of the automaton.

* * * * *